United States Patent [19]

Dannheim et al.

[11] 4,280,978
[45] Jul. 28, 1981

[54] PROCESS OF EMBOSSING AND PERFORATING THERMOPLASTIC FILM

[75] Inventors: Walter R. Dannheim, Andover; John A. McNaboe, Lake Hopatcong, both of N.J.

[73] Assignee: Monsanto Company, St. Louis, Mo.

[21] Appl. No.: 41,869

[22] Filed: May 23, 1979

[51] Int. Cl.³ .................. B29C 17/00; B29D 27/00
[52] U.S. Cl. ................... 264/156; 264/154; 264/163; 264/284; 264/DIG. 47; 264/DIG. 48; 264/DIG. 70
[58] Field of Search ............. 264/DIG. 47, DIG. 48, 264/DIG. 70, 145, 156, 280, 284, 293, 292, 288.8, 154, 163

[56] References Cited

U.S. PATENT DOCUMENTS

| | | | |
|---|---|---|---|
| 728,829 | 5/1903 | Arkill | 425/363 |
| 3,292,619 | 12/1966 | Egler. | |
| 3,323,983 | 6/1967 | Palmer et al. | 264/280 |
| 3,703,432 | 11/1972 | Koski | 264/156 |
| 3,718,059 | 2/1973 | Clayton | 264/154 |
| 3,762,255 | 10/1973 | Clash et al. | |
| 3,789,710 | 2/1974 | Silverstein. | |
| 3,814,101 | 6/1974 | Kozak. | |
| 3,881,489 | 5/1975 | Hartwell. | |
| 3,911,187 | 10/1975 | Roley | 264/280 |
| 3,929,135 | 12/1975 | Thompson. | |
| 4,000,242 | 12/1976 | Hartbauer | 264/284 |
| 4,151,240 | 4/1979 | Lucas | 264/154 |
| 4,211,743 | 7/1980 | Nauta et al. | 264/284 |

FOREIGN PATENT DOCUMENTS 484929 of 1938 United Kingdom ............ 264/156

Primary Examiner—James B. Lowe
Attorney, Agent, or Firm—Michael J. Murphy

[57] ABSTRACT

In the process of embossing film by continuously passing the film through a nip formed by cooperating pattern and backup rolls, the improvement of passing the embossed pattern while in registration with the pattern roll through a second nip to improve the pattern detail. The apparatus includes a second backup roll in pressurized contact with the pattern roll forming the second nip. The surface configuration of the rolls may be such as to locally perforate the film within the pattern.

11 Claims, 8 Drawing Figures

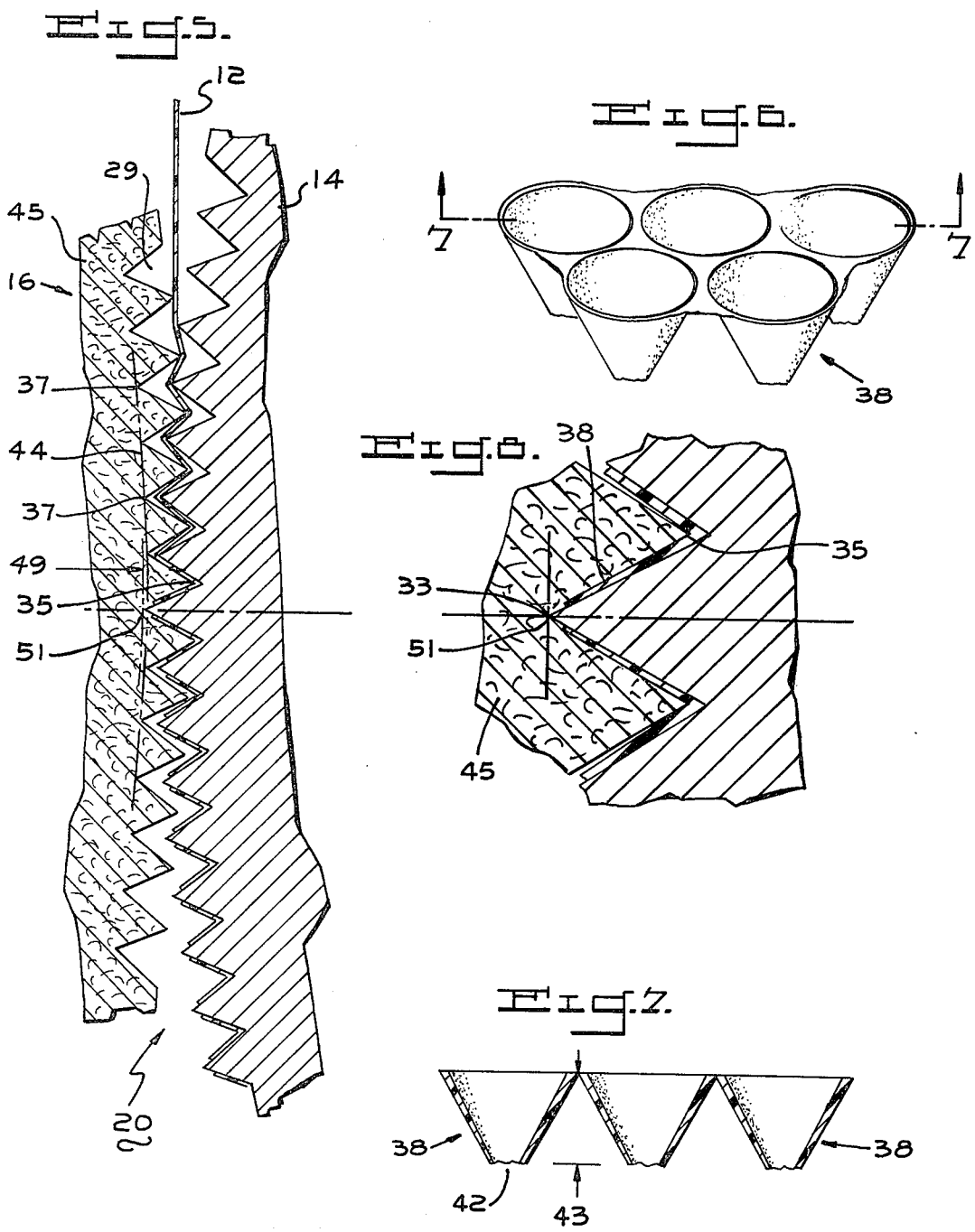

PROCESS OF EMBOSSING AND PERFORATING THERMOPLASTIC FILM

BACKGROUND OF THE INVENTION

This invention relates to embossing and more particularly to process and apparatus for continuously embossing and preferably perforating film.

Systems are known in the art for continuously embossing, and for perforating in combination with embossing, thermoplastic film in forming various products such as disposable diapers, surgical dressings, bandages, sanitary napkins, towels, incontinent pads, hospital underpads, breathable garments, ground cover for moisture preservation and the like. However, to the best of our knowledge no presently known system is capable of embossing difficult patterns at high speeds and wide widths with a high degree of uniformity in terms of embossing detail. This is particularly so with respect to completeness of perforation in patterns where the film is systematically pierced at preselected localized points at the extremities of the embossed pattern to form a multiplicity of through-holes, as in providing the absorptive device top-sheet design disclosed in U.S. Pat. No. 3,929,135.

SUMMARY OF THE INVENTION

Accordingly, a principal object of this invention is to provide an improved method and apparatus for embossing thermoplastic film.

Another object is to provide an improved method and apparatus for continuously embossing thermoplastic film with a high degree of uniformity of embossing detail and perforating consistency when the latter is desired as part of the embossed pattern.

A specific object is to provide an improved method and apparatus having low capital requirements for positive pressure embossing and perforating thermoplastic film at high line speeds.

A particular object is to provide means in an embossing system to reduce deflection of the pattern roll at substantial nip pressures.

Other objects of this invention will in part be obvious and will in part appear from the following description and claims.

These and other objects are accomplished in the process of embossing a thermoplastic film which includes continuously passing such film through a nip formed by pattern and backup rolls to form an embossed pattern therein by providing the improvement which comprises passing the embossed pattern while in registration with the pattern roll through a second nip to improve the pattern detail.

Also provided in apparatus for embossing a film which includes opposing pattern and backup rolls forming a nip is the improvement comprising a second backup roll in pressurized contact with the pattern roll forming a second nip.

BRIEF DESCRIPTION OF THE DRAWINGS

In describing the invention, reference will be made to the accompanying drawings wherein:

FIG. 5 is a schematic, sectional view in enlarged detail of a portion of the apparatus of FIGS. 1 and 2;

FIG. 6 is a partial, three-dimensional view of a film pattern produced by the system of FIGS. 1–5;

FIG. 7 is a sectional view along 7—7 of FIG. 6; and

FIG. 8 is an enlarged, partial sectional schematic view of a portion of the apparatus of FIG. 5.

DETAILED DESCRIPTION OF THE ILLUSTRATED EMBODIMENT

Figure 1:
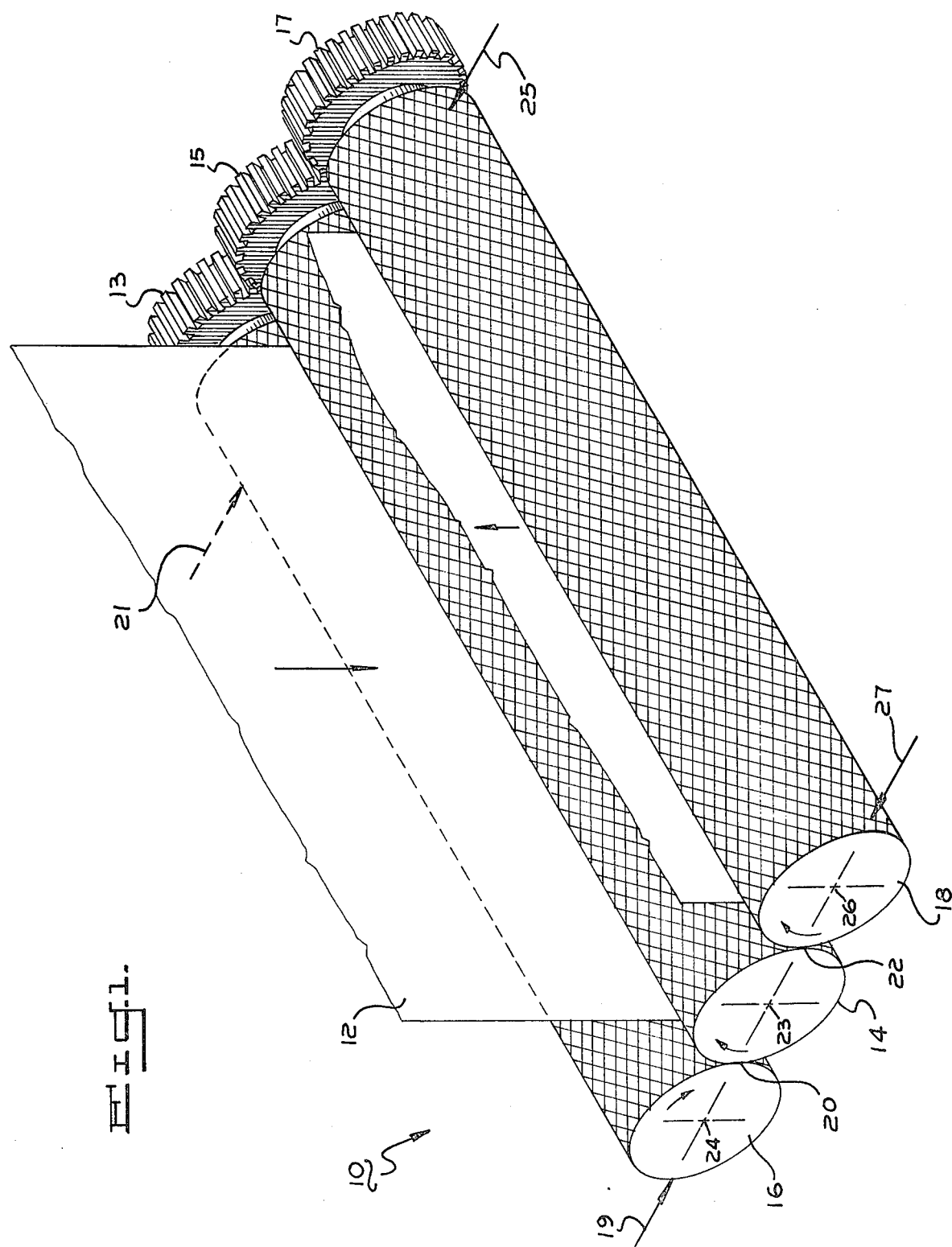
FIG. 1 is a schematic view of a system embodying the present invention.

As used here and in the claims, the term "film" means any flexible thermoplastic material having a thickness of from about 0.25 to about 10 mils (0.000635 to 0.025 cms.). Referring to the drawings, there is shown in FIG. 1 an assembly collectively identified as 10 for embossing continuous film 12 which comprises single rigid pattern roll 14 and dual, opposite backup rolls 16, 18, each of the latter in operation having an outer cylindrical surface portion in pressurized contact with pattern roll 14 to form first pressure nip 20 and second pressure nip 22. Longitudinal axis 26 of roll 18 preferably lies in a common plane with those of parallel axes 23 and 24 of pattern roll 14 and first backup roll 16. This position of roll 18 at the illustrated substantially 180 degrees to axis 23 of roll 14 is important in the three roll system shown in order to offset any deflection or bowing in the central region of middle pattern roll 14 which might otherwise occur if first backup roll 16 were used solely with roll 14. Such deflection is undesirable since it adversely affects embossing pattern uniformity. Conventional means (not shown) such as pressurized fluid cylinders and associated mechanical linkages, are provided to adjustably apply lateral forces to the ends of roll 16 in the direction of arrows 19, 21 and equal and opposite forces to roll 18 in the direction of arrows 25, 27 in order to establish substantially the same preset pressure levels in each nip. This arrangement substantially nullifies any bowing of roll 14 and insures straightness along its full length even at relatively substantial nip pressures and roll lengths on the order of about six to about ten feet (1.8 to 3.1 meters). Since the surfaces of rolls 16, 18 are of a yieldable material, to be further described, each such backup roll per se is subject to deflection and to compensate for this, each roll 16, 18 is "crowned". This latter term in the embossing art means a gradual, slight increase in diameter in the central region of the roll relative to its ends.

Pattern roll 14 is made of steel or equivalent rigid material and is temperature controlled through internal circulation of an appropriate heat transfer medium such as hot water or oil. Roll 14 in cross section, not shown, comprises spaced concentric inner and outer tubes with the outer surface of the outer tube provided with male projections 28, to be further described, with the heat transfer madium being continuously circulated at high velocity through the annular space between tubes in heat exchange contact with the outer tube.

Backup rolls 16 and 18 in the illustrated embodiment are identical, typically comprising successive discs or a single elongated sleeve of permanently yieldable material 45 (FIG. 5) such as cloth, for example, cotton, wool, felt, blends of same or the like. This material is applied over the ends of a cylindrical shaft forming part of the roll and in the case of discs forced at high axial compressive pressures tightly against each other by conventional fabrication procedures known in the art until the desired roll surface properties are achieved. Such rolls constructed in this manner and of the aforesaid yieldable textile base fabric materials are commonly generically called "paper" rolls in the embossing art. Each roll 16, 18 is not purposely temperature controlled in the illustrated system and in operation assumes essentially the temperature of heated pattern roll 14. A break-in procedure prior to initial process use permanently deforms the surfaces of backup roll 16, 18 into a female surface pattern comprising a multiplicity of immediately adjacent conical depressions 29 (FIG. 5) constituting substantially the reverse configuration of male projections 28 on roll 14. In this respect, after the break-in period individual depressions 29 in rolls 16 and 18 when in an unloaded condition in the sense of being unstressed through engagement with projections 28 are importantly incrementally smaller in size than projections 28 to the extent of the level of yield which material 45 of a backup roll 16 (FIG. 5) can undergo when under the compressive influence of projections 28 in the nip during operation of the system. This is depicted in FIG. 5 by dotted circular line 44 along which lie apices 37 of unstressed depressions 29 in comparison with inner line 49 which is intersected by the apex 51 of each depression 29 at the point in the nip of maximum entry of a projection 28 in a depression 29. This size difference between male and female formations is important for reasons to be described in forming the perforated pattern of FIGS. 6 and 7. When rolls 16 and 18 are the preferred paper rolls, such backup roll break-in procedure involves rotation of the rolls at high nip pressures while applying a liquid such as a dilute solution of ammonium hydroxide to the backup roll surfaces over a period on the order of about 1 to 3 days. Such solution promotes softening and flow of the paper and facilitates formation of the female pattern therein by male projections 28.

Each roll 14, 16, 18 is provided with a gear 15, 13, 17 respectively. Each gear has relatively deep teeth preferably in continuous meshing engagement in order to importantly preserve the alignment of pins 28 and backup roll depressions 29. Gear engagement is still maintained even after rotation is stopped and either or both of backup rolls 16, 18 is laterally separated from pattern roll 14. Such aligned separation capability is desirable, for example, to facilitate clearing blockages in either of nips 20, 22 should continuous film 12 rupture during line operation or to permit threading of the system with film during startup.

Conventional drive means and motion transmitting devices (not shown) are provided for rotating pattern 14 and backup rolls 16 and 18 by moving either of them. Such rolls are conventionally journally mounted for rotation in the direction of the arrows shown in FIG. 1 about axes 23, 24 and 26.

Figure 3:
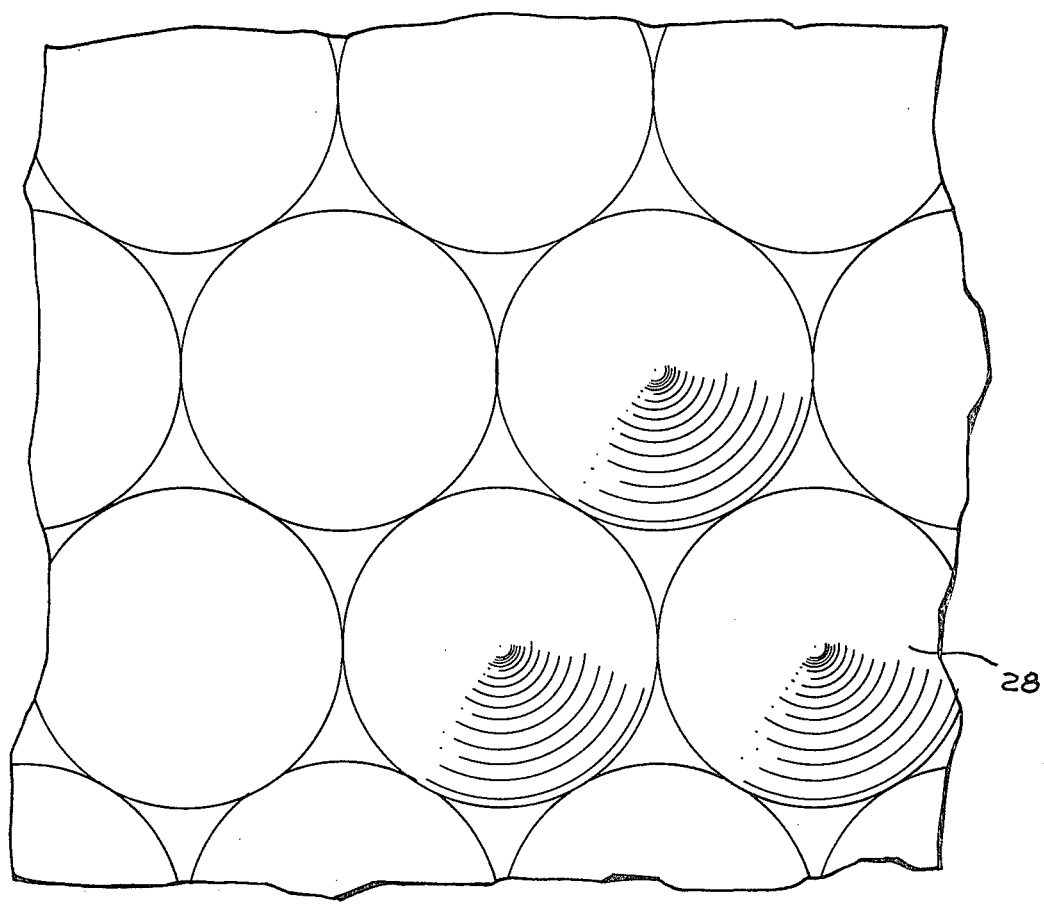
FIGS. 3 and 4 are plan and elevation views respectively in enlarged detail of a particular pattern roll design for use in the system of FIGS. 1 and 2.
Figure 4:
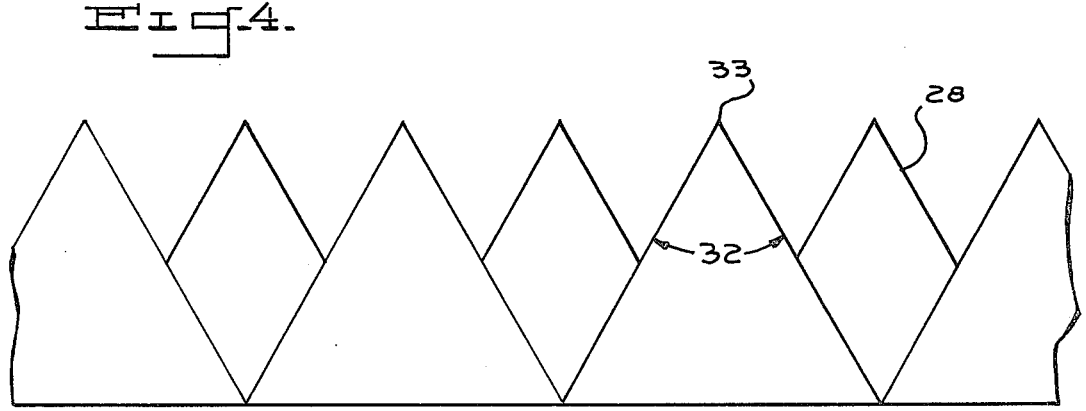

The regular pattern of male projections on pattern roll 14 shown in the drawings comprises a multiplicity of closely adjacent conical protrusions 28 (FIGS. 3 and 4) on the order of about 500 to about 800 in number per square inch (78 to 124 per square centimeter) of roll surface, projecting about 5 to about 40 mils (0.013 to 0.102 cms.) outwardly of the peripheral face of pattern roll 14. Each projection 28 forms an included apex angle 32 dictated by the pattern depth which permits free exit of a projection 28 form its mating depression 29 during rolling contact with the backup rolls without having the apex 33 of the conical projection undesirably curl over. As particularly shown in FIG. 5, each projection 28 in the region of each nip 20, 22 progressively enters, temporarily forcibly deflects the sides of and finally exits one of the multiplicity of permanent, conical, projection-receiving depressions 29 in the surfaces of backup rolls 16 and 18, each such depression substantially forming the matching reverse image of a tapered projection 28. When the latter is fully inserted the projection-receiving alignment of each projection 28 with its cooperating depression 29 is preserved in nips 20 and 22 via the constant meshing engagement of gears 15, 13, and 17 on rolls 14, 16 and 18.

In operation, low to medium density polyethylene film 12 about 1 mil (0.0025 cm.) thick, preferably unheated and of narrow molecular weight distribution, is continuously advanced through first nip 20 at relatively high linear velocities, preferably between about 150 to about 1000 feet (45.5 to 305 meters) per minute. Loading of backup rolls 16 and 18 against pattern roll 14 can be between about 100 to about 2000 pounds per lineal inch (14.6 to 294 kgs./cm.) but is preferably maintained at about 200 to about 600 pounds per lineal inch (29.4 to 88 kgs./cm.) of roll contact surface in each of nips 20 and 22. On advancing toward nip 20, film 12 is in a taut, tensioned condition maintained by controlling the rotative speed of conventional supply rolls (not shown) upstream of nip 20. The film is then gradually locally elongated since interposed between heated projections 28 at an operating temperature of about 140° to about 220° F. (60° to 104° C.) advancing into cavities 29 in roll 16 in the manner depicted in FIG. 5. The total depth of draw in nip 20 depends on the pattern being formed with draws more than five times and preferably on the order of from about 10 to about 35 times the film thickness possible with the particular system of the drawings. Such contact with the heated projections thermally softens the film to the point where it flows and the local distending of the thin hot film into cavities 29 forcibly impresses embodiments 38 (FIG. 8) therein of gradually diminishing thickness toward the embossment apex. When the film is locally impaled on a projection 28 at its maximum entry into a depression 29 it is desirably being rigidly supported across the width of backup roll 16 through forced contact with apices 35 (FIG. 5) of female cavities 29 in roll 16 whereupon rupture occurs at failure at completion of the draw at the relieved apex 37 of depressions 29, or in other words at the extremities of embossments 38. Such elongation to failure of the taut, hot film assists in film rupturing as does the yieldable material forming cavities 29. In this latter respect, the pointed tip 33 of a cone passes through the film when a projection bottoms out in a depression and the yieldable surfaces of the depressions in nip 20 are compressively displaced to the position shown in somewhat exaggerated detail at 51 in FIG. 8. Since the process, however, is dynamic and not completely susceptible of analysis at a given instant it is conceivable that some perforating through melting occurs in portions of the film on initial impact contact with the heated projections prior to drawing into the backup roll cavities, while embossing via drawing without perforating is concurrently occurring in other portions of the film. In any event, perforating at the apex of the conical embossments after passage through nip 20 has been found to provide an opening size on the order of about 50 to 60 percent of the total desired finished opening size present after passage through second nip 22.

Figure 2:
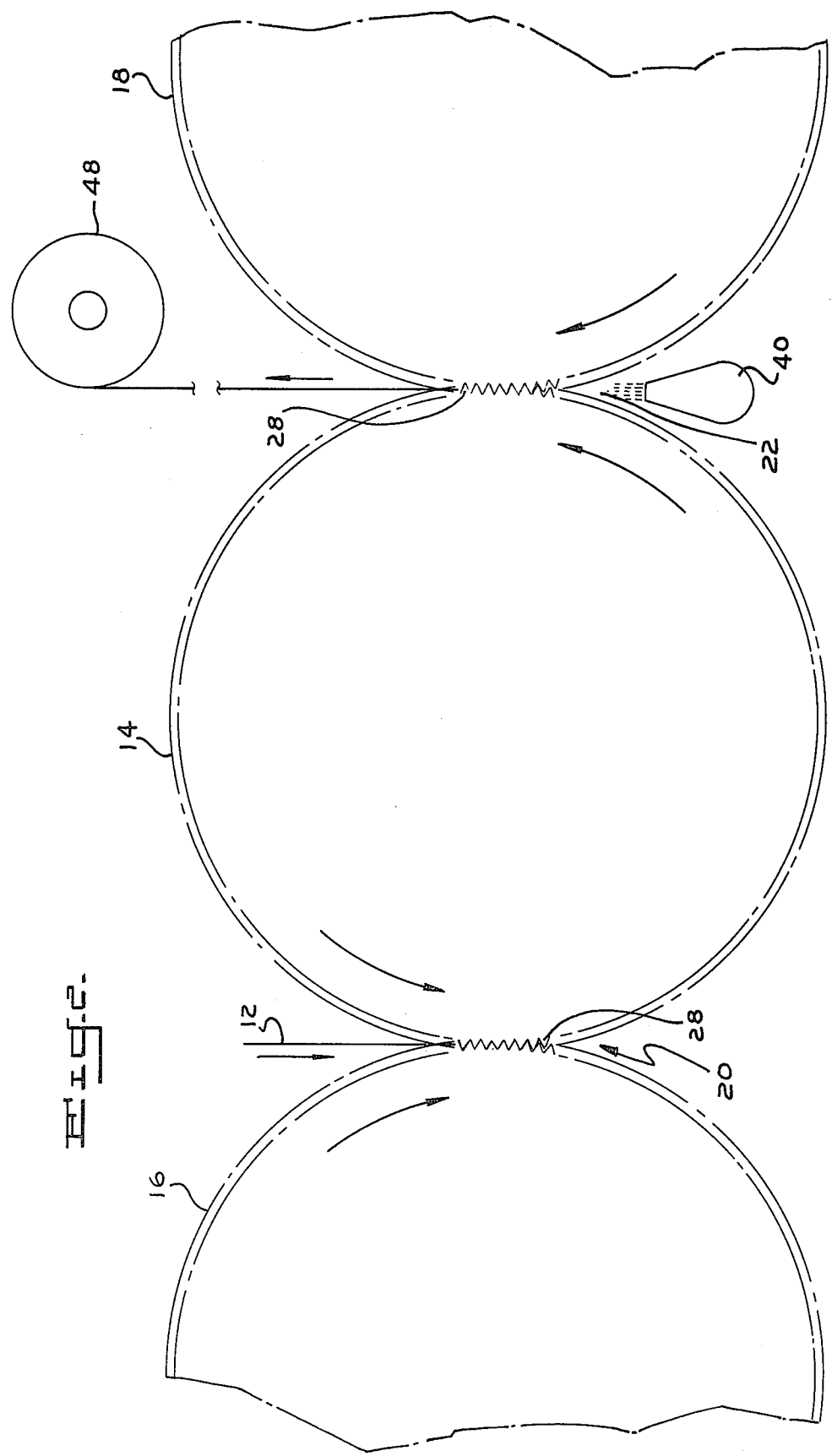
FIG. 2 is a partial end view of the system of FIG. 1 including a downstream discharge roll.

After the semi-manufactured embossed pattern has been partially formed in first nip 20, the conical projections 28 of roll 14 with the film impaled thereon exit depressions 29 of roll 16 through continued rotative movement of the rolls whereupon the pattern while in registered contact with such male projections 28 passes through about 180 degrees toward and eventually through second nip 22. While the tensioned film 12 is in peripheral contact with heated pattern roll 14 for a finite interval during passage through such 180 degrees, any elastic memory developed in the film as a result of the drawing which had previously occurred in first nip 20 tends to dissipate which facilitates perforation without memory recovery or undesirable shrink back in second nip 22 where the pattern detail is finalized. The cooperating entry of projections 28 into cavities 29 in second nip 22 is preferably substantially exactly the same as that occurring in first nip 20. An air knife 40 (FIG. 2) associated with second nip 22 may be provided to promote setting of the final plastic pattern. In nip 22 projections 28 enter depressions 29 in the surface of roll 18 to rupture those embossments not previously perforated and finish-perforate or enlarge those openings previously formed in the first nip 20, with the result that the film on exiting nip 22 is substantially 100 percent perforated in region 42 (FIG. 7) at the extremities of truncated conical embossments 38. Examination of the pattern formed in first nip 20 prior to passage through second nip 22 reveals holes or openings smaller than desired, whereas on exiting nip 22 such size is enlarged for example to about 12 to about 20 mils. Though variable with the pattern, the average distance in practice which embossments 38 have extended away from the plane of the film, i.e. distance 43 in FIG. 7, is on the order of about 20 mils (0.051 cms.). Continued rotary movement of the rolls causes projections 28 on roll 14 to exit the finish-formed embossments 38 whereupon the embossed and perforated film passes over conventional idler roll 48 (FIG. 2) to downstream takeup equipment (not shown) which may be used as necessary.

With respect to line speed, for the embossing pattern shown or for similar embossing-perforating patterns in which selective, localized perforating occurs, it is felt that operating performance in terms of uniformity, consistency and completeness of embossing and perforating improves as the advancing speed of the film through the system increases. This is because conditions are purposely established in the nips to promote impact failure of the plastic and as the rate at which the film is impacted with sharp pins 28 increases, greater perforating consistency should be realized at relatively high rather than low line speeds.

The above description and particularly the drawings are set forth for purposes of illustration only and are not to be taken in a limited sense. Various modifications and alternations will be readily suggested to persons skilled in the art. For example, if desired for certain patterns and perhaps even for the pattern of the illustrated embodiment, more than two nips, for example three or more nips can be formed by appropriately disposing additional backup rolls adjacent the periphery of the main pattern roll and arranging for passage of the film seriatim successively through the plural nips in the manner previously described. Furthermore, though a plural nip system has been described as particularly applicable to formation of perforated patterns, it may be used to form any pattern with or without perforations such as one which cannot be formed with the desired degree of definition in a single nip, as for example in forming deep non-perforated embossments to successively greater depths in sequential nips. Though the system has been illustrated as operating in a horizontal plane, it should be realized that the rolls could be operated in any plane, such as vertical. Though the illustrated male projections are conical in shape, they likewise could be circular, ellipitical, rectangular, diamond-shaped or the like.

In general, for embossing patterns requiring perforation, resilient backup rolls without permanent cavities cannot be deformed sufficiently by male pattern roll projections at reasonable pressures to permit adequate perforation of the film. Instead of the paper backup rolls previously described, independently temperature controlled rolls with permanent depressions can be used wherein the surfaces are formed of other materials which are sufficiently yieldable at practical pressures when the tip of the male projection bottoms out in the female cavity as to accomplish penetration of the film. In this respect soft metals such as lead, babbitt, copper, alloys of same and the like could be used as well as soft elastomeric material such as rubber or plastic which could be provided on the rolls, depending on the material, by extrusions, dipping, machining after initial thickness buildup and like processes.

Though a plural nip system has been described, it may be possible with certain patterns to obtain desired results by employing the disclosed combination of male pattern, permanent yet yieldable depressions in a single nip system. Though it is preferred to operate with a single ply film it may be possible to use plural plies and separate (or not as desired) the plies after formation of the pattern therein. Instead of the illustrated and preferred one to one relationship between pattern and backup roll diameters, it is also possible to preserve the desired surface registration between pattern and backup rolls with different roll diameter ratios such as, for example, by use of a backup roll having a greater diameter than the pattern roll. It should be realized that a different, for example reduced, nip pressure could be employed in the second nip of a plural nip system versus that of the primary nip. Though a single set of projections mating with depressions in plural backup rolls is preferred for economic reasons, it is possible to reverse the arrangement and provide plural sets of projections mating with a single set of depressions. Though the backup roll forming a second nip is preferably at 180 degrees to the pattern and first backup roll axes for deflection-compensating purposes, such location can vary from this when, for example, roll sizes differ and nip pressures are such that roll deflection is not a problem. In general, the second backup roll can be located such that its axis 26 when viewed from the left in a layout as shown in FIG. 1 is between about 30 to about 330 degrees to pattern roll axis 23. It is intended therefore, that the foregoing be considered as exemplary only and that the scope of the invention be ascertained from the following claims.

What is claimed is:

1. In the process of embossing and perforating a thermoplastic film which includes continuously passing such film through a nip formed by pattern and backup rolls to form an embossed pattern therein, the improvement which comprises:
    passing the embossed pattern while in registration with the pattern roll which previously formed said embossed pattern through a second nip formed with the same pattern roll, said embossed pattern in the second nip being drawn and perforated within permanent depressions in another cooperating backup roll to finalize the pattern detail.

2. The process of claim 1 wherein said registration is continuous through about 180 degrees of arc.

3. The process of claim 1 wherein heated protrusions in the pattern roll are forced into the film in the first nip.

4. The process of claim 1 wherein heated protrusions in the pattern roll are forced into and through the film in said second nip in the embossed pattern previously formed in the first nip.

5. The process of claim 1 wherein heated protrusions in the pattern roll are forced into and through the film in the first and second nips.

6. The process of claim 1 wherein the compressive pressure in said second nip is between about 200 to about 600 pounds per lineal inch of nip.

7. The process of claims 3, 4 or 5 wherein the protrusions are at a temperature of about 140° to about 220° F.

8. The process of claim 7 wherein the embossed pattern comprises a multiplicity of tapered projections.

9. The process of claim 8 wherein the tapered projections are perforated at their narrowest ends.

10. In the process of embossing and perforating a thermoplastic film which includes passing such film through a nip formed by pattern and backup rolls to form an embossed and perforated pattern therein, the improvement which comprises:

passing the embossed and perforated pattern while in continuous registration with the pattern roll which previously formed said embossed and perforated pattern through a second nip formed with the same pattern roll, said embossed and perforated pattern in the second nip being drawn within permanent depressions in another cooperating backup roll to enlarge the size of perforations formed in the previously embossed and perforated pattern.

11. The process of claim 5 wherein said heated protrusions with the film impaled thereon progressively enter, forcibly deflect the surfaces of and then exit cooperating depressions in the backup rolls forming the first and second nips.

* * * * *